(No Model.)
2 Sheets—Sheet 2.
T. A. WILLARD.
DEVICE FOR REGULATING ELECTRICITY GENERATED BY MEANS OF WIND POWER.
No. 519,881. Patented May 15, 1894.
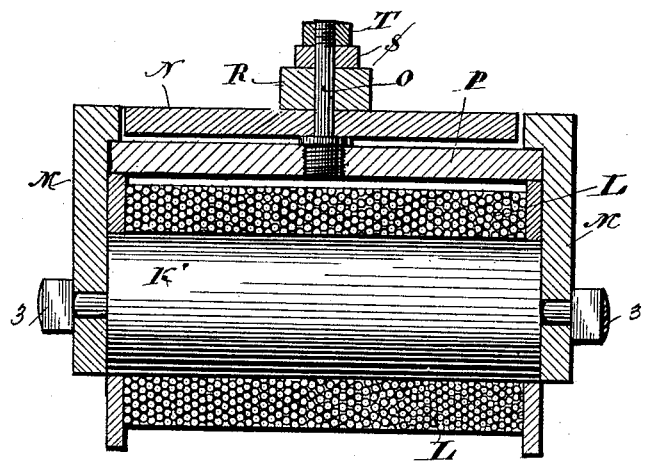
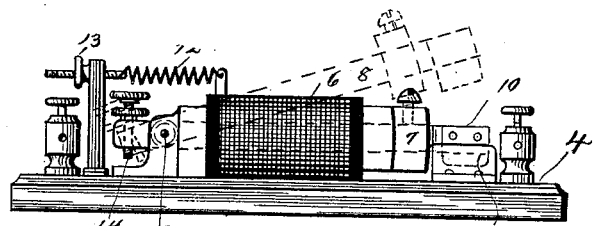
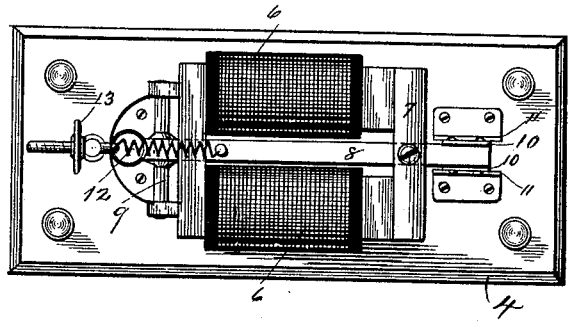
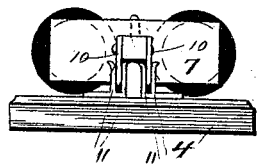

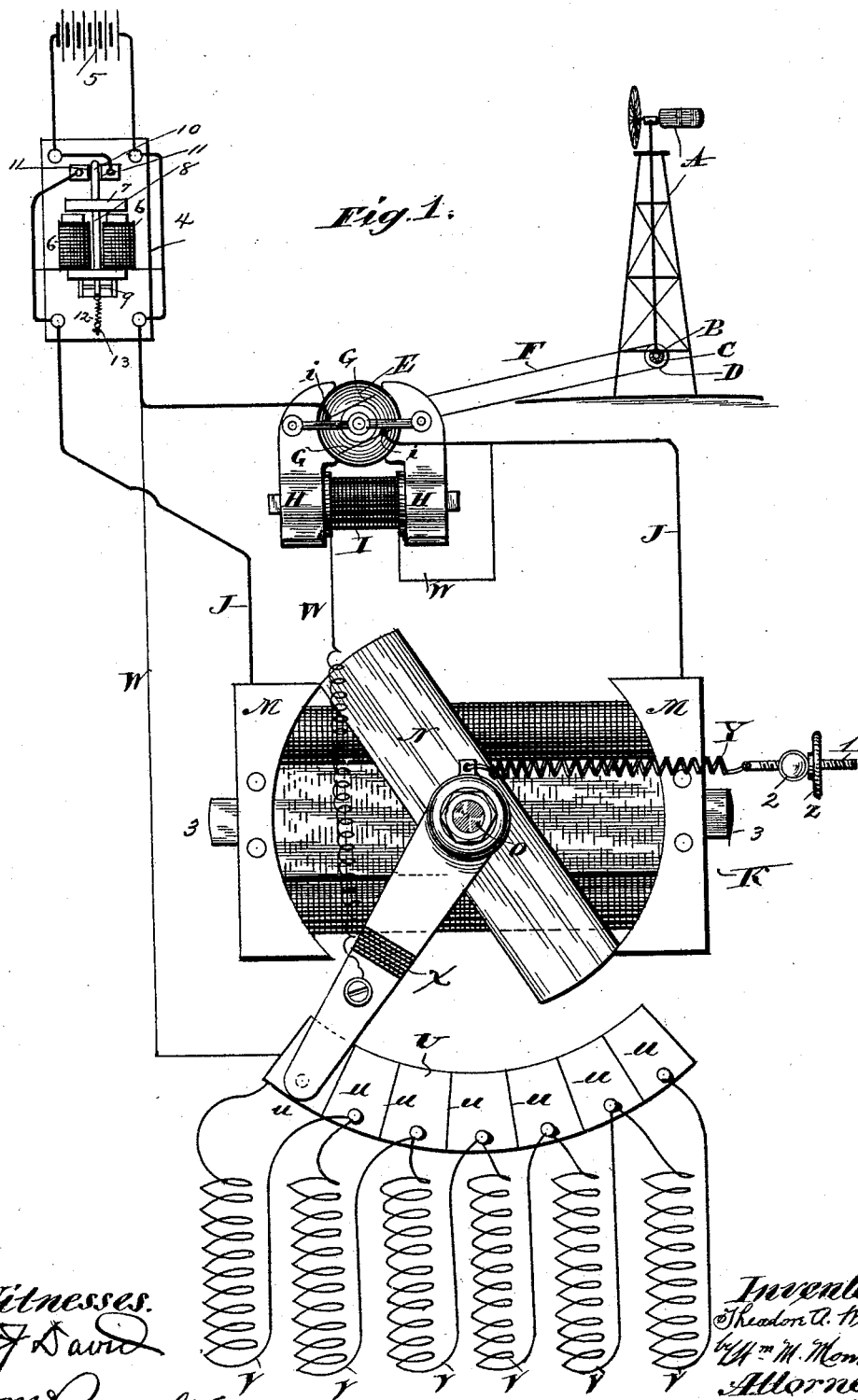

UNITED STATES PATENT OFFICE.

THEADORE A. WILLARD, OF NORWALK, OHIO.

DEVICE FOR REGULATING ELECTRICITY GENERATED BY MEANS OF WIND-POWER.

SPECIFICATION forming part of Letters Patent No. 519,881, dated May 15, 1894.

Application filed April 6, 1893. Serial No. 469,354. (No model.)

*To all whom it may concern:*

Be it known that I, THEADORE A. WILLARD, a citizen of the United States, and a resident of Norwalk, county of Huron, State of Ohio, have invented certain new and useful Improvements in Devices for Regulating Electricity Generated by Means of Wind-Power, of which I hereby declare the following to be a full, clear, and exact description, such as will enable others skilled in the art to which it appertains to make and use the same.

My invention relates to improvements in that class of devices designed for use in connection with windmill or other irregular power, for regulating the strength of the current in the field circuit of the generator, so as to obtain a current in the main circuit of stationary pressure or voltage without regard to any irregularity in the speed of the generator or wind mill.

The invention consists in certain peculiarities in the construction, substantially as hereinafter described and particularly pointed out in the subjoined claims.

In the accompanying drawings, Figure 1 is a plan view of the regulator with accompanying main and field circuit, windmill and accumulator with connections. Fig. 2 is a vertical central section through the regulating device. Figs. 3, 4 and 5 are side, plan and end views of automatic cut out respectively.

In the figures A is a windmill shown reduced in size for convenience.

B and C are bevel gears driven by the mill.

D is a pulley connected with the armature E of the generator by means of the belt F. It will be observed that the generator is placed exterior to the mill and independent thereof in every respect.

G are the brushes, H the pole pieces, and I the field coil.

J is the main circuit wire connected with the brushes at $i$.

K is the regulating device, consisting in the soft core K' wound with coarse wire L and provided with pole pieces M, which are placed in the main circuit.

N is an armature centrally pivoted at O to the brass cross bar P which is attached at either extremity to the poles M.

O is the pivot post screwed tightly into the cross-bar P and supporting also the lever R which is clamped, by means of washers S and nut T to the armature N and moves therewith. The outer extremity of the lever R, moves in an arc over the segment U composed of sections $u$ connected by the resistance coils V which are thrown into series with the field circuit W as the lever moves over the segment. As seen the field is shunt wound.

X is an insulation which prevents leakage of the current on the lever.

Y is a spring tension adjusted by means of the thumb nut Z upon the screw 1 which passes through the post 2.

3, 3, are bolts which secure the pole-pieces to the soft core.

Y' is a stop for limiting the movement of the lever in one direction.

4 is an automatic switch on the main circuit shown in detail in Figs. 3, 4 and 5, to prevent back pressure, while 5 is the accumulator. The construction of the switch is simple and it is introduced to prevent back pressure, of the current when the mill and generator lose their speed or stop from any cause. In this switch, 6, 6, are magnets provided with the armature 7 secured to the lever 8 pivoted at 9. The contact plate 10 is secured to the lever extremity and is adapted on the fall of the lever to make contact with the plates, 11 on the main circuit. The magnets are wound with fine wire of high resistance in the shunt circuit and are adapted to pull down the armature and connect the plates 10 and 11 when the current generated by the mill and dynamo is sufficiently strong to charge the accumulator but when the current in the main wire is too light or is cut off the spring 12 adjustable by means of the thumb nut 13 will pull up the armature and cut off the current before back pressure can take place.

14 is a stop for the lever 8.

The advantages of this regulating device are obvious in retaining a uniform pressure in the field of the generator so that a constant current will be generated in the main circuit derived therefrom.

Having described my invention, what I claim as new, and desire to secure by Letters Patent, is—

1. A means for regulating a main electric circuit derived from irregular power, comprising an accumulator and an automatic switch in the main circuit, a field circuit, and a regulator, proper, consisting of a wound soft core, having pole pieces at its ends, in the main circuit, a cross bar, secured to said pole pieces, an armature, pivoted to said cross bar, a switch lever, pivoted to and movable with said armature, the outer end of said switch lever being in the field circuit, a spring, connected to said lever, segments, over which said lever moves and with which its free end contacts, and resistance coils connected with said segments, substantially as described.

2. A regulator, consisting of a wound soft core, having pole pieces at its ends, a cross bar secured to said pole pieces, an armature, pivoted at its center to said cross bar, a switch lever, pivoted to and movable with said armature, a spring engaging the pivoted end of said switch lever, segments over which said switch lever moves and with which its free end contacts, and resistance coils, connecting said segments, substantially as described.

3. In a means for regulating a main electric circuit derived from irregular power, a regulator, proper, having its poles in the main circuit and provided with a cross bar, an armature pivotally mounted thereon, a lever movable with said armature and having its outer free end connected with the field circuit wire, a spring engaging the pivoted end of said lever, segments over which said lever moves and with which its free end contacts, and resistance coils connecting said segments, all arranged, combined and operating substantially as described and for the purposes specified.

THEADORE A. WILLARD.

Witnesses:
  WM. M. MONROE,
  J. W. MCREYNOLDS.